United States Patent [19]
Kotos et al.

[11] 3,893,052
[45] July 1, 1975

[54] SHOCK-RESISTANT INDICATING DEVICE

[75] Inventors: Peter Kotos, Havertown, Pa.; Harry G. Kokolis, Cherry Hill, N.J.

[73] Assignee: General Electric Company, New York, N.Y.

[22] Filed: Sept. 26, 1974

[21] Appl. No.: 509,505

[52] U.S. Cl. ............................... 335/229; 340/373
[51] Int. Cl. ............................................... H01f 7/08
[58] Field of Search .......... 335/229, 230, 234, 279; 340/373, 378

[56] References Cited
UNITED STATES PATENTS

| | | | |
|---|---|---|---|
| 3,022,450 | 2/1962 | Chase | 335/229 X |
| 3,755,766 | 8/1973 | Read | 335/229 |
| 3,792,390 | 2/1974 | Boyd | 335/229 |
| 3,828,288 | 8/1974 | Boyd | 335/234 |

*Primary Examiner*—G. Harris
*Attorney, Agent, or Firm*—J. W. Haubner; W. Freedman; F. L. Neuhauser

[57] ABSTRACT

In the disclosed indicating device a plunger is normally held in a retracted, non-indicating position by a permanent magnet. An electro-magnet, upon energization, develops a flux opposing the holding flux of the permanent magnet to allow the plunger to be displaced by a spring into its indicating position. The magnetic circuit for most of the holding flux from the permanent magnet comprises a wall of magnetic material containing an aperture through which the plunger extends with a loose fit and through which it moves upon displacement by the spring. For preventing undesired displacement of the plunger out of its retracted position as a result of mechanical shocks and vibrations, there is developed on the plunger in the region where it passes through the aperture a radially-acting magnetomotive force that holds the outer periphery of the plunger in contact with a restricted portion of the internal wall of the aperture.

8 Claims, 2 Drawing Figures

3,893,052

SHOCK-RESISTANT INDICATING DEVICE

BACKGROUND

This invention relates to an electro-magnetically operated indicating device and, more particularly to an indicating device of this type which can be operated by exceptionally small amounts of electrical input energy and yet which is highly resistant to false operation as a result of mechanical vibrations, shocks, and stray magnetic fields.

The following references are of interest with respect to this device: U.S. Pat. Nos. 2,740,956-Hatton; 3,422,426-Bailey et al; 3,671,893-Edgar et al; 3,693,122-Willard; and 3,783,423-Mater et al.

Our indicating device comprises a plunger of magnetic material, a permanent magnet for normally holding the plunger in a retracted position relative to a frame which is also made of magnetic material, spring means biasing the plunger away from the frame and toward an indicating position, and an electro-magnetic tripping coil operable upon energization to reduce the effective holding force from the permanent magnet to a magnitude sufficient to allow the spring means to drive the plunger into an indicating position through an aperture in the frame.

If only small amounts of input energy are to be employed by the electro-magnetic means for effecting release of the plunger from the permanent magnet, then the holding force from the permanent magnet typically must be low. But if this holding force is low, the plunger is susceptible to being unintentionally released by mechanical vibrations or shocks.

SUMMARY

An object of our invention is to construct an indicating device in such a manner that it is operable by exceptionally small amounts of electrical input energy supplied to the electro-magnetic tripping coil and yet is highly resistant to false operation as a result of mechanical vibrations or shocks.

Another object is to construct the indicating device in such a manner that a permanent magnet of exceptionally small volume may be used for normally holding the plunger in its withdrawn position despite mechanical vibrations and shocks.

Accordingly, in carrying out our invention in one form, we provide an indicating device in which an indicating plunger is normally held in a retracted, non-indicating position by a permanent magnet. An electromagnet, upon energization, develops a flux opposing the holding flux of the permanent magnet to allow the plunger to be displaced by a spring into its indicating position when the electromagnet is energized. The magnetic circuit for most of the holding flux from the permanent magnet comprises a wall of magnetic material containing an aperture through which the plunger extends with a loose fit and through which it moves upon displacement by the spring. For preventing undesired displacement of the plunger out of its retracted position as a result of mechanical shocks and vibrations, there is developed on the plunger in the region where it passes through the aperture a radially-acting magnetomotive force that holds the outer periphery of the plunger in contact with a restricted portion of the internal wall of the aperture. This radially-acting force is made possible by reason of the fact that the aperture is substantially larger than the plunger and the plunger is allowed to contact only a restricted portion of the internal wall, thus forcing most of the holding flux from the permanent magnet to follow a path through this restricted portion of the internal wall.

BRIEF DESCRIPTION OF THE DRAWINGS

This invention will be more fully understood and its various objects and advantages will be more fully appreciated from the following description taken in conjunction with the accompanying drawings in which.

DETAILED DESCRIPTION OF PREFERRED EMBODIMENT

Figure 1:
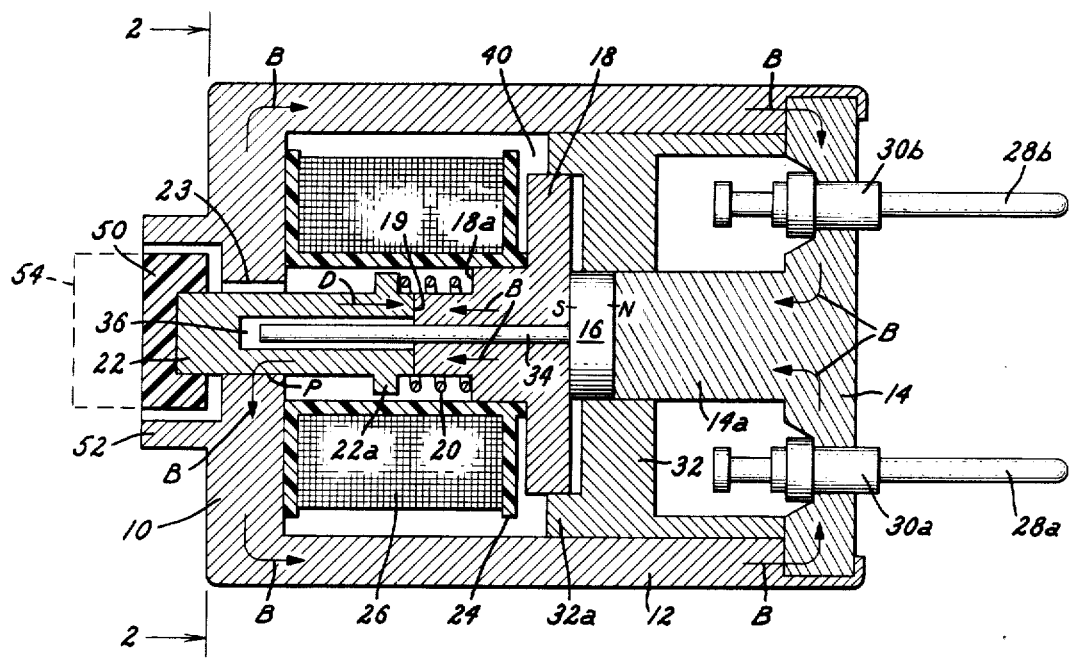
FIG. 1 is a cross section of a shock-resistant indicating device embodying one form of our invention.

Referring now to FIG. 1, the illustrated indicating device includes a first end wall 10 which is connected by a cylindrical frame member 12 to a second end wall 14 as shown. Frame 12, along with end walls 10 and 14, is made of highly magnetically permeable material (e.g., iron or steel). We prefer to construct frame 12 as a member of hollow, generally-cylindrical shape. This cylindrical shape is advantageous since it results in the frame completely surrounding the remaining components of the device, thereby providing a low reluctance path about these components that intercepts any stray magnetic fields and essentially excludes them from these components, thus allowing the components to operate without interference from such fields.

Mounted on wall 14 of our device by means of a pole piece 14a is a permanent magnet 16. Magnet 16 is preferably of a cobalt-rare earth material, particularly cobalt-samarium. Cobalt-rare earth magnets have high coercive force and are very resistant to demagnetization. The particular properties of magnets of this type are more fully described in U.S. Pat. No. 3,671,893-Edgar, Martzloff and Thompkins, which is assigned to the assignee of the present invention.

While one pole N of magnet 16 is in close contact with pole piece 14a, the other pole S abuts a flux-diverting or controlling member 18 which is also made of highly permeable material. When the device is in its normal or non-indicating condition, a plunger 22 closely contacts flux-diverting member 18 at interface 19, and this plunger protrudes with a loose fit through aperture 23 of wall 10 as shown. Plunger 22 is also made of highly magnetically permeable material, and therefore in the absence of other forces, plunger 22 is attracted toward flux-diverting member 18 by means of a first magnetomotive force due to permanent magnet 16.

For biasing the plunger 22 away from flux-diverting member 18 and toward an extended, indicating position, we provide a compression spring 20 that bears at one end against a shoulder 18a on the flux-diverting member and at its opposite end against a shoulder 22a on the plunger 22. This spring exerts a force in opposition to the holding force of the permanent magnet 16 but is normally of insufficient magnitude to overcome this holding force.

Also abutting the flux-diverting member 18 is a bobbin 24 which is made of non-magnetic material (e.g., stainless steel, brass, or nylon) and upon which is wound normally unenergized coil 26, whose ends (not shown) are connected to terminal pins 28a and 28b. Pins 28a and 28b pass through wall 14 and are insulated therefrom by insulating washers 30a and 30b respectively. Bobbin 24 is radially spaced from plunger 22 in order that the longitudinal motion of the plunger will not be hampered.

For preventing radial displacement of the permanent magnet 16, the flux-diverting member 18, and the coil 26 out of their illustrated positions, an annular spacer 32 of a non-magnetic material such as aluminum is provided. This spacer 32 fits between the flux-diverting member 18 and end wall 14. It has an internal bore in which the permanent magnet fits and an annular lip 32a near its outer periphery in which the outer periphery of the flux-diverting member fits. The bore of bobbin 24 fits about an extension of flux-diverting member 18.

For guiding the plunger 22, there is provided a guide pin 34 of non-magnetic material which tightly fits within a hole extending along the central longitudinal axis of flux-diverting member 18 and which loosely fits within a central cavity 36 located in plunger 22 and which extends parallel to its longitudinal axis. The diameter of cavity 36 is slightly larger than that of pin 34, and since the diameter of aperture 22a is slightly larger than the outside diameter of plunger 22, the plunger, while generally constrained to movement in the longitudinal direction, can be moved slightly in the radial direction as well. Accordingly, the plunger can move into its position illustrated in FIG. 2 where its outer periphery contacts the internal wall of aperture 23 along a restricted portion only of the internal wall, more specifically, only in the region of point P.

Figure 2:
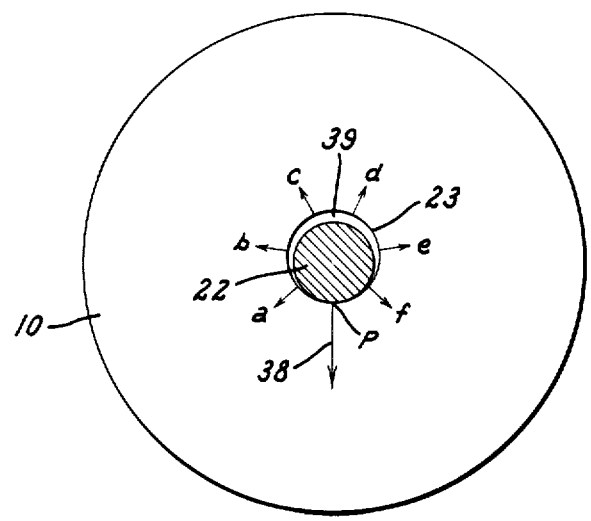
FIG. 2 is a cross-sectional view along the line 2—2 of FIG. 1. Some of the cross-hatching is omitted for clarity.

When the plunger 22 is in its non-indicating position shown in FIG. 1, the magnetic circuit for most of the flux from the permanent magnet 16 is from one pole of the magnet through the flux-diverting member 18, plunger 22, one end wall 10, frame 12, the other end wall 14, and the pole piece 14a to the other pole of the permanent magnet. The principal holding flux follows a path through these parts generally indicated by the arrows B. Referring to FIG. 2, this principal holding flux, in passing between plunger 22 and the end wall 10 passes for the most part through a path in the immediate region of point P since this is the lowest reluctance path between the parts. Elsewhere the air gap 39 between plunger 22 and the aperture 23 is relatively large and thus imposes a relatively high reluctance to flux therethrough.

As a result, there is a relatively large magnetomotive force holding the outer periphery of plunger in contact with the internal wall of aperture 23 at point P. This force is represented by arrow 38. The magnetic forces attracting plunger 22 in other radial directions are represented by arrows $a-f$ and are of much smaller magnitude.

The operation of our device may be summarized as follows. Normally there is no current flowing in coil 20, and plunger 22 is held in its retracted solid-line position as shown in FIG. 1. Under these conditions the magnetic force at the interface 19 between flux-diverting member 18 and plunger 22 due to permanent magnet 16 is sufficient to counteract the opposing spring force due to spring 20. Furthermore a low reluctance path is established through point P at which plunger 22 contacts the inside wall of aperture 22a. At this point P a second magnetomotive force is developed by magnet 16 in the radial direction which will tend to keep plunger 22 in close contact with end wall 10. Thus plunger 22 is constrained in a longitudinal direction and in a direction transverse to this and therefore is firmly restrained against displacement by vibrations and mechanical shock. The coil 26 is so wound that when it is energized, flux is produced at the interface 19 between plunger 22 and flux-diverting member 18 which is in opposition to the flux which is developed at this point due to permanent magnet 16. When the force due to spring 20 exceeds the instantaneous holding force resulting from the difference in the flux from the permanent magnet less that from the electromagnet, plunger 22 will be driven outward by spring 20 through aperture 23 to its extended or indicating position. As plunger 22 separates from flux-diverting member 18, the increasing air gap at interface 19 greatly reduces the flux through point P, and the magnitude of the second magnetomotive force is greatly decreased, thus allowing plunger 22 to easily move to its extended position.

Because the plunger is restrained in its retracted position by magnetic forces acting at spaced-apart locations both axially and radially of the plunger, as above described, it is especially resistant to accidental displacement by vibrations and shocks whether they act in an axial, a radial, or any combination of these directions with respect to the plunger. Moreover, since the plunger 22 is magnetically constrained at point P, as well as at the interface 19, when it is in its retracted position, the size of permanent magnet 16 may be reduced without sacrificing desired resistance of the plunger to accidental displacement due to mechanical vibration and shock. The reduction in size of permanent magnet 16 allows our indicating device to be reduced in its outside dimensions and since the strength of its field has been reduced at the interface 19 between plunger 22 and flux-diverting member 18, the bucking field produced by coil 26 and thus the current required for tripping can also be reduced. In a practical embodiment of our invention, a very small amount of electrical energy input, less than one millijoule in magnitude can be used for releasing a plunger one-eighth inch in diameter and about three-eighths inches long.

Flux developed by the electromagnet 26 passes through the interface 19 as indicated by arrow D. A portion of this opposing flux passes radially outward through flux-diverter 18 and across the gaps 40, and most of the remaining portion passes through the permanent magnet 16 in opposition to the holding flux. Since the permanent magnet is highly resistant to demagnetization, we can force a large percentage of the opposing flux therethrough in a direction counter to the holding flux without demagnetizing the permanent magnet. In one embodiment of our invention the relatively large gaps 40 limit the amount of counterflux passing radially outward through the flux diverter 38 to about half the total counter-flux. The use of the cobalt-rare earth magnet permits further reductions in the size of our device since these magnets are capable of developing a strong coercive force compared to conventional magnets of the same size. Furthermore, since these magnets are highly resistant to demagnetization, the gaps 40 can be relatively large as explained above. The presence of these large gaps allows the normal holding flux to be utilized more efficiently since the gaps reduce the amount of such flux that is diverted radially outward through the flux diverter 18 when the plunger is in its normal retracted position.

The presence of 14a pole piece 14a that does not extend appreciably beyond the outer periphery of the permanent magnet 16 also aids in minaturization because it results in the path for any stray flux around the magnet periphery being of a higher reluctance than it would be if iron was present in this region. Decreasing the reluctance presented to stray flux results in a greater portion of the total flux being used for the desired plunger-holding function.

In a preferred form of the invention, the plunger 22 is provided with a brightly-colored enlarged cap 50 at its outer end that makes operation of the plunger more conspicuous. This cap 50 fits loosely within a hollow boss 52 on the front end wall 10. Its front face is normally flush with the front end of the boss, but the cap is projected into its dotted-line extended position 54 when the plunger is extended in response to indicator operation. The hollow boss 52 has a bore that is sufficiently large as to prevent the outer periphery of the cap from engaging it. Thus, the boss 52 and cap 50 do not interfere with the magnetic plunger's engaging the internal wall of aperture 23 as shown in FIG. 2.

The cap 50 serves also to reduce the chances of foreign matter, such as dust, entering the indicating device through aperture 23 since the cap's presence in the hollow boss results in the presence of a restricted, tortuous passage between the surrounding atmosphere and the aperture.

While we have shown and described one form of our invention, modifications will surely occur to those skilled in the art. It is contemplated, therefore, by the following claims to cover all such modifications as fall within the true spirit and scope of our invention.

What we claim as new and desire to secure by Letters Patent of the United States is:

1. A shock-resistant electromechanical indicating device comprising:
   a. spaced-apart first and second walls and a frame connecting said walls, said walls and said frame being made of a highly magnetically permeable material, and said first wall containing an aperture;
   b. a reciprocally-movable, generally-cylindrical plunger also made of highly magnetically permeable material extending into said aperture with a loose fit, said plunger having a normal retracted position and an extended indicating position;
   c. spring means normally producing a force urging said plunger toward said extended position;
   d. guide means for guiding said plunger for a movement in a direction substantially parallel to the longitudinal axis of said plunger but allowing the outer periphery of said plunger when the plunger is in its retracted position to contact the internal wall of said aperture along a restricted portion of said internal wall;
   e. a permanent magnet member fixed relative to said second wall producing a first magnetomotive force which is in opposition to and of a magnitude greater than said spring force and a second magnetomotive force applied in a radial direction to said plunger at said aperture;
   f. said second magnetomotive force normally holding the outer periphery of said plunger in contact with said restricted portion of the internal wall of said aperture when the plunger is in said retracted position; and
   g. a normally-deenergized coil surrounding but spaced from said plunger energizable to produce flux in opposition to that from said permanent magnet, thus reducing said first magnetomotive force sufficiently to allow said spring to drive said plunger to its extended position.

2. An electromechanical indicating device as defined in claim 1 in which said permanent magnet member is of cobalt-rare earth material.

3. An electromechanical indicating device as defined in claim 2 in which the material of said magnet comprises cobalt-samarium.

4. An electromechanical indicating device as defined in claim 1 in which said guide means comprises a cavity in said plunger extending generally parallel to the longitudinal axis of the plunger and a pin member of non-magnetic material fitting loosely within said cavity.

5. An electromechanical indicating device as defined in claim 1 in which said frame comprises a hollow generally cylindrical member of highly magnetically permeable material surrounding said plunger, said permanent magnet, and said electromagnet which is effective to substantially exclude stray magnetic fields from said surrounded components.

6. An electromechanical indicating device as defined in claim 1 in which:
   a. said plunger member in its retracted position is held against a magnetic flux-controlling member, and
   b. said guide means comprises a cavity in one of said members extending generally parallel to the direction of movement of the plunger and a guide pin of non-magnetic material fitting loosely in the cavity.

7. An electromechanical indicating device as defined in claim 1 in which said permanent magnet is located adjacent a pole piece disposed between said magnet and said second wall, said pole piece and said magnet having longitudinal axes that are generally axially aligned, said pole piece extending radially outward from its longitudinal axis not substantially beyond the outer periphery of said permanent magnet.

8. An indicating device as defined in claim 1 comprising a cap on the outer end of said plunger that is larger in diameter than the plunger, the outer periphery of said cap fitting in the bore of hollow structure on said first wall to provide around the exterior of the cap a restricted tortuous path between said aperture and the surrounding atmosphere, said bore being sufficiently large relative to said cap as to prevent the cap from interfering with contact between said plunger and said internal wall of the aperture.

* * * * *